US010718431B2

(12) United States Patent
Berning et al.

(10) Patent No.: US 10,718,431 B2
(45) Date of Patent: Jul. 21, 2020

(54) EARTH WORKING MACHINE HAVING A SHIFTABLE TRANSMISSION BETWEEN A DRIVE MOTOR AND A ROTATABLE WORKING APPARATUS

(71) Applicant: Wirtgen GmbH, Windhagen (DE)

(72) Inventors: Christian Berning, Zülpich (DE);
Tobias Stinner, Weyerbusch (DE);
Cyrus Barimani, Königswinter (DE);
Hardy Wilhelmi, Dattenberg (DE)

(73) Assignee: Wirtgen GmbH (DE)

( * ) Notice: Subject to any disclaimer, the term of this patent is extended or adjusted under 35 U.S.C. 154(b) by 95 days.

(21) Appl. No.: 15/916,529

(22) Filed: Mar. 9, 2018

(65) Prior Publication Data
US 2018/0266552 A1 Sep. 20, 2018

(30) Foreign Application Priority Data

Mar. 15, 2017 (DE) .................. 10 2017 204 336

(51) Int. Cl.
*F16H 61/688* (2006.01)
*F16H 3/091* (2006.01)
(Continued)

(52) U.S. Cl.
CPC ............ *F16H 61/688* (2013.01); *F16H 1/28* (2013.01); *F16H 3/0915* (2013.01); *F16H 7/22* (2013.01);
(Continued)

(58) Field of Classification Search
CPC .... F16H 2702/02; F16H 2702/06; F16H 7/22; F16H 61/682; F16H 1/28; F16H 57/033;
(Continued)

(56) References Cited

U.S. PATENT DOCUMENTS 2,637,221 A * 5/1953 Backus .................. F16H 37/043
74/745
3,893,345 A * 7/1975 Sisson ..................... F16H 3/085
74/331
(Continued)

FOREIGN PATENT DOCUMENTS

CN 102588525 A 7/2012
CN 103061238 A 4/2013
(Continued)

OTHER PUBLICATIONS

EPO Search Report for corresponding European patent application EP 18 16 1532, dated Jul. 27, 2018, 6 pages (not prior art).
(Continued)

*Primary Examiner* — Stacey A Fluhart
(74) *Attorney, Agent, or Firm* — Lucian Wayne Beavers; Patterson Intellectual Property Law, PC

(57) ABSTRACT

An earth working machine (10), encompassing a drive motor (42) and a working apparatus (22) drivable by the drive motor (42) so as to move rotationally, the drive motor (42) being connected to the working apparatus (22), for transfer of a torque, with interposition of a shiftable transmission (50; 150) comprising at least two gearing stages having different torque transfer ratios, is characterized in that by means of a first gearing stage of the shiftable transmission (50), an input shaft (48), coupled on the input side to the drive motor (42), of the shiftable transmission (50) is connectable in torque-transferring fashion directly to an output shaft (52), coupled on the output side to the working apparatus (22), of the shiftable transmission (50) so as to rotate together at the same rotation speed; and by means of a second gearing stage of the
(Continued)

shiftable transmission (50), the input shaft (48) is connectable in torque-transferring fashion, with interposition of a transmission assemblage (64), to the output shaft (52) so as to rotate together at different rotation speeds.

20 Claims, 4 Drawing Sheets

(51) Int. Cl.
  F16H 1/28 (2006.01)
  F16H 7/22 (2006.01)
  F16H 57/033 (2012.01)
  E01C 23/088 (2006.01)
  F16H 57/02 (2012.01)

(52) U.S. Cl.
  CPC .......... F16H 57/033 (2013.01); *E01C 23/088* (2013.01); *F16H 2057/02056* (2013.01); *F16H 2200/0034* (2013.01)

(58) Field of Classification Search
  CPC ......... F16H 2057/02056; F16H 3/0915; E01C 23/088
  See application file for complete search history.

(56) References Cited

U.S. PATENT DOCUMENTS

| | | | |
|---|---|---|---|
| 5,190,398 A | 3/1993 | Swisher | |
| 5,819,601 A * | 10/1998 | Kuhn | F16H 3/0915 74/745 |
| 6,085,606 A * | 7/2000 | Stine | F16H 3/095 74/331 |
| 6,718,841 B1 * | 4/2004 | Schepperle | F16H 3/0915 74/359 |
| 7,318,788 B2 * | 1/2008 | Karlsson | B60K 17/28 477/78 |
| 8,958,959 B2 | 2/2015 | Von Schonebeck et al. | |
| 9,297,125 B2 | 3/2016 | Hammes et al. | |
| 9,791,028 B2 | 10/2017 | Walter | |
| 2006/0166787 A1 * | 7/2006 | Heinzelmann | F16H 3/0915 477/109 |
| 2008/0173740 A1 | 7/2008 | Parker et al. | |
| 2010/0018194 A1 | 1/2010 | Kovach et al. | |
| 2016/0238109 A1 * | 8/2016 | Akashi | F16H 3/006 |
| 2016/0334011 A1 | 11/2016 | Watt et al. | |
| 2017/0138448 A1 * | 5/2017 | Keller | F16H 57/035 |
| 2018/0135730 A1 * | 5/2018 | Yu | F16H 3/32 |

FOREIGN PATENT DOCUMENTS

| | | |
|---|---|---|
| CN | 103206489 A | 7/2013 |
| CN | 203514169 U | 4/2014 |
| CN | 104842772 A | 8/2015 |
| CN | 104870683 A | 8/2015 |
| DE | 1650676 A1 | 2/1970 |
| DE | 3600007 A1 | 7/1987 |
| DE | 1128832 A1 | 3/1993 |
| DE | 102009029785 A1 | 12/2010 |
| DE | 102012009310 A1 | 11/2013 |
| DE | 102012012738 A1 | 1/2014 |
| DE | 102015210841 A1 | 12/2015 |
| EP | 347142 A1 | 12/1989 |
| FR | 2983788 A1 | 6/2013 |
| GB | 1217153 A | 12/1970 |
| WO | 2010145645 A1 | 12/2010 |

OTHER PUBLICATIONS

China Office Action for corresponding application 201810179203, dated Nov. 20, 2019, 6 pages (not prior art).

European Patent Office Search Report for corresponding patent application No. EP 19 18 4832, dated Aug. 21, 2019, 6 pages (not prior art).

\* cited by examiner

EARTH WORKING MACHINE HAVING A SHIFTABLE TRANSMISSION BETWEEN A DRIVE MOTOR AND A ROTATABLE WORKING APPARATUS

BACKGROUND OF THE INVENTION

1. Field of the Invention

The present invention relates to an earth working machine encompassing a drive motor and a working apparatus drivable by the drive motor so as to move rotationally, the drive motor being connected to the working apparatus, for transfer of a torque, with interposition of a shiftable transmission comprising at least two gearing stages having different torque transfer ratios.

2. Description of the Prior Art

An earth working machine of the species is known, for example, from DE 10 2012 009 310 A1 (U.S. Pat. No. 9,297,125). This document discloses an earth working machine, for example a road miller, recycler, or stabilizer, whose drive train encompasses at one end a diesel internal combustion engine constituting a drive motor, and at the other end a milling drum, rotatable around a milling drum axis, constituting a working apparatus. A shiftable transmission that comprises two gearing stages is arranged in the torque transfer path between the internal combustion engine and the milling drum. Each gearing stage respectively encompasses a first gear pair on the input shaft and a second gear pair on the output shaft, the first gear pairs of the two gearing stages sharing, on the input side, a common input drive pinion that is coupled to the input drive shaft of the internal combustion engine so as to rotate together at the same rotation speed.

Each gearing stage possesses a dedicated intermediate shaft. Arranged on each intermediate shaft is a respective output drive pinion, meshing with the common input drive pinion, of the first gear pair of the gearing stage associated with the intermediate shaft; and a respective input drive pinion of the second gear pair of the associated gearing stage. The input drive pinions of the second gear pair of the first and the second gearing stage respectively mesh with a separate output drive pinion on an output shaft of the transmission.

Each of the two intermediate shafts is embodied as a split intermediate shaft whose input-side and output-side shaft parts are respectively disconnectable, or connectable so as to rotate together, via a shiftable clutch, so that the torque transfer path can be shifted between the two gearing stages under load.

Because each intermediate shaft connects the input shaft of the transmission to the output shaft of the transmission, at any given moment during operation only one of the two intermediate clutches can be in a torque-transferring state, while the respective other intermediate clutch must interrupt the torque transfer path along its intermediate shaft.

The transmission known from DE 10 2012 009 310 A1 (U.S. Pat. No. 9,297,125) furthermore comprises a power takeoff to which a hydraulic pump is connected so that it too can be driven by the internal combustion engine via the transmission.

A further earth working machine is known from DE 10 2012 012 738 A1.

In contrast to the document of the existing art recited earlier, in the earth working machine of DE 10 2012 012 738 A1 torque transfer in the shiftable transmission takes place not via an intermediate shaft but instead exclusively directly from an input shaft of the transmission to an output shaft, parallel to the input shaft, of the transmission.

Each gearing stage therefore encompasses only one respective gear pair, the input shaft of the transmission carrying both input drive pinions of the gear pair, and the output drive shaft carrying the output drive pinions of the two gear pairs. The output drive pinions on the output drive shaft are mutually couplable and decouplable for torque-transferring connection, by way of a claw clutch, exclusively to the output drive shaft. Here as well, only one gear pair can be coupled in torque-transferring fashion to the output drive shaft at any point in time during operation of the known shiftable transmission.

The input shaft of the transmission passes through the transmission housing and, at its longitudinal end pointing away from the internal combustion engine, projects out of the transmission housing as a power takeoff. A hydraulic pump to be driven via the power takeoff is respectively connected at this power takeoff and at a further power takeoff.

The output drive shaft also projects, at its longitudinal end opposite from the coupling to the milling drum, out of the pump housing and forms a combined auxiliary drive/power takeoff. This auxiliary drive/power takeoff is coupled to a hydraulic pump operable as a hydraulic motor, so that when one of the two gearing stages is in operation, the output drive shaft is rotationally driven by the internal combustion engine, and the internal combustion engine can thus also drive the combined pump/hydraulic motor apparatus as a hydraulic pump.

The claw clutch used for respective torque-transferring coupling of one of the two gearing stages can also be brought into a neutral position in which neither of the two output drive pinions is coupled in torque-transferring fashion to the output drive shaft. In this neutral position, the combined hydraulic pump/hydraulic motor apparatus, constituting a hydraulic motor, can rotationally drive the output drive shaft and thus the milling drum for maintenance purposes.

Due to the use of the claw clutch, the shiftable transmission known from DE 10 2012 012 738 A1 cannot be shifted under load. Instead, in this case the load must be briefly interrupted for a shifting operation.

FIG. 12 of U.S. Pat. No. 5,190,398 A discloses an earth working machine, having an internal combustion engine as a drive motor and a rotationally drivable milling drum, in whose drive train is a shiftable transmission that is not characterized in further detail.

The shiftable transmission is coupled for torque transfer on both the input side and the output side, via respective belt drives, to the internal combustion engine and the milling drum.

US 2008/0173740 A1 discloses an earth working machine having an internal combustion engine from whose drive shaft, via a distributor transmission, both a hydraulic pump and (via a separate output drive) a milling drum are rotationally driven. According to the disclosure of US 2008/0173740 A1, a stepless transmission referred to as an "infinitely variable transmission" (IVT) is located between the internal combustion engine and the milling drum so that the transfer of rotation speed and torque from the internal combustion engine to the milling drum can be modified. A steplessly modifiable transmission known as a "continuously variable transmission" (CVT), or an automatically shiftable multi-ratio transmission, can also be provided instead of the IVT transmission.

The earth working machines of the species having different gear pairs are disadvantageous in that the gear pairs of the shiftable transmission, which usually step the power supplied from the internal combustion engine down in terms of rotation speed and up in terms of torque, exhibit different degrees of wear depending on the operating time of the individual gearing stages. The result is either an increased number of maintenance operations so that on one occasion gears of the one gearing stage, and on another occasion gears of the other gearing stage, can be maintained or replaced; or that in one maintenance operation the gears of all the gearing stages are always replaced even though some of them could easily continue to operate given their wear status.

SUMMARY OF THE INVENTION

The object of the present Application is therefore to refine the earth working machine recited previously in such a way that it becomes possible to operate the drive motor with minimal resource utilization and therefore in a steady state in an optimum rotation speed range with a maximally constant rotation speed, and nevertheless to allow its drive power to be transferred to the working apparatus, in different combinations of rotation speed and torque, without thereby loading portions of the drive train to different degrees and thus causing differing wear.

This object is achieved according to the present invention by way of an earth working machine of the kind recited previously in which, by means of a first gearing stage of the shiftable transmission, an input shaft, coupled on the input side to the drive motor, of the shiftable transmission is connectable in torque-transferring fashion directly to an output shaft, coupled on the output side to the working apparatus, of the shiftable transmission so as to rotate together at the same rotation speed; and in that by means of a second gearing stage of the shiftable transmission, the input shaft is connectable in torque-transferring fashion, with interposition of a transmission assemblage, to the output shaft so as to rotate together at different rotation speeds.

Thanks to the particular design of the earth working machine according to the present invention, either, in a first gearing stage, the input drive shaft of the drive motor is fixedly coupled to the output shaft, coupled to the working apparatus, of the shiftable transmission so as to rotate together at the same rotation speed (this is referred to in the present Application as "direct drive") or, in the second gearing stage, the input drive shaft and the power of the drive motor available there are coupled, with a change in rotation speed and torque by the transmission assemblage, to the output shaft, coupled to the working apparatus, of the shiftable transmission.

Thus, in the context of the two gearing stages considered here, either all the components of the transmission assemblage which are involved in a rotation speed-modifying and torque-modifying power transfer are in the power-transferring path from the drive motor to the drive apparatus, or none of them are. All the components of the transmission assemblage involved in a change in rotation speed and torque therefore wear uniformly, since according to the present invention a shift is made not between two transmission sets that transfer torque differently, but instead between a direct drive mode that dispenses with a transmission assemblage, and a rotation speed-modifying and torque-modifying transmission assemblage.

Because of the particular design of the transmission according to the present invention, the latter furthermore has enhanced fail-safe characteristics as compared with the existing art. This is because even if the transmission assemblage were to sustain damage, the working apparatus can continue to be operated by means of the first gearing stage, which directly connects the input and output shafts. The rotation speed of the working apparatus might then not be optimal for an operational task to be performed, but in many cases earth working using a working apparatus driven at a sub-optimal working speed is still preferable to total failure of the earth working machine.

In addition to better fail-safe characteristics, a further advantage resulting from the structure of the shiftable transmission of the earth working machine according to the present invention is enhanced efficiency. Load-dependent losses are unavoidable even with transmission means that transfer torque positively, such as gears. With a tooth set, load-dependent losses constitute a considerable portion (between approximately 85% and 99%) of the total power loss. The first gearing stage, with direct coupling of the input shaft and output shaft of the shiftable transmission, can therefore be operated with considerably decreased load-dependent losses compared with gear-type transmission stages of the existing art, since they dispense with any torque step-up or step-down.

As will be explained below, there is no intention here to rule out the possibility for the shiftable transmission of the earth working machine according to the present invention to comprise further power takeoffs in addition to the output drives recited. The input shaft, coupled to the drive motor, of the shiftable transmission will therefore be referred to hereinafter as the "principal input drive" of the shiftable transmission. The output drive, coupled to the working apparatus, of the shiftable transmission is likewise referred to as the "principal output drive."

Although, purely theoretically, the drive motor can be a drive motor based on any physical operating principles, the advantages of the present invention are usable to a particular extent when an internal combustion engine, in particular a diesel internal combustion engine, is used as a drive motor, since the operation of the drive motor at a very largely steady-state rotation speed made possible by the present invention, simultaneously with the various rotation speed/torque pairs of the working apparatus which are usable, result both in a decrease in fuel consumption and in reduced pollutants.

Because the drive power is the product of the rotation speed and torque of the components transferring the drive power, the same drive power can be achieved using different rotation speed/torque pairs that yield the same product.

With the use of a direct-drive mode as a gearing stage in which a continuous physical connection is established between the principal input drive and principal output drive, the present Application furthermore makes do with fewer components, or with fewer moving components, in the shiftable transmission as compared with the existing art of the species recited previously, thereby additionally contributing to the robustness of the shiftable transmission. On the one hand, the components involved are uniformly loaded as described above, which makes them easier to design for appropriate loading and enhances their respective component service life. On the other hand, as described above, the fail-safe characteristics of the earth working machine as a whole are also enhanced, since the highly robust direct-drive mode, with very little fault susceptibility because of the small number of components that suffice for constituting it, allow it to be operated even if a defect were to occur in the second gearing stage, and in fact with higher efficiency as compared with a gear pair or generally with a step-up or step-down in torque.

The designer is, however, free to select the transfer ratios not of two gearing stages but only of one. This disadvantage can nevertheless be accepted in order to obtain the aforementioned advantages, since, especially in the preferred case of an internal combustion engine constituting the drive motor and a milling tool that removes substrate material, for example a milling drum or milling rotor, the high rotation speed of the internal combustion engine as compared with the operating rotation speed of the milling tool is reduced by at least one further transmission, with an increase in the transferred torque. When a further transmission of this kind is incorporated, what is important is less the absolute values of the transfer ratios of the two gearing stages of the shiftable transmission, and more their relationship to one another. The at least one further transmission can be designed, in terms of its transfer ratio with regard to the transfer ratios of the shiftable transmission, in such a way that the resulting overall transfer ratios of all the transmissions arranged between the drive motor and working apparatus assume desired values.

In order to allow the direct-drive mode constituted by the first gearing stage to be controllably activated and deactivated, according to an advantageous refinement of the present invention provision can be made that the first gearing stage encompasses a direct-drive clutch with which, depending on the engagement state of the direct-drive clutch, the input shaft is connectable directly to the output shaft so as to rotate together at the same rotation speed, or is disconnectable from the output shaft. A slight slippage that may occur as torque is transferred via the engaged direct-drive clutch is negligible in comparison with usual transfer ratios achieved and achievable by transmission assemblages, and may therefore be left out of consideration when assessing the rotation speed identity of the direct connection between input shaft and output shaft established by the direct-drive clutch.

Not only the first gearing stage, but also the second gearing stage, must be capable of being controllably activated and deactivated. Selectable activation or deactivation of the second gearing stage can advantageously be implemented in terms of design by the fact that the second gearing stage encompasses an intermediate shaft that is connected to the input shaft via a first transmission sub-assemblage of the transmission assemblage and is connected to the output shaft via a second transmission sub-assemblage of the transmission assemblage, the second gearing stage furthermore encompassing an intermediate clutch with which a torque transfer from the input shaft to the output shaft via the intermediate shaft can be established or interrupted depending on the engagement state of the intermediate clutch.

Torque is thus transferred from the input shaft to the intermediate shaft via the first transmission sub-assemblage, and torque is transferred from the intermediate shaft to the output shaft of the shiftable transmission with the second transmission sub-assemblage. The intermediate clutch can in principle be arranged at any point along the torque transfer path between the first and the second transmission sub-assemblage. It can even be provided in the torque transfer path on the input shaft or on the output shaft, for example in order to establish and interrupt a torque transfer between one of the shafts selected from the input shaft and output shaft and a torque-transferring component respectively of the first and second transmission sub-assemblage. In the interest of maximally efficient utilization of available installation space, however, placement of the intermediate clutch on the intermediate shaft is preferred. The direct-drive clutch and intermediate clutch can thus be arranged at a sufficient distance from one another.

Simplified mounting of the intermediate shaft, as compared with an intermediate clutch arranged physically between the transmission sub-assemblages, is achieved if the intermediate clutch is arranged between a component of one of the transmission sub-assemblages and the intermediate shaft itself, since the intermediate shaft can then be rotationally mounted using an unsplit shaft body. The mounting of two intermediate sub-shafts of a split intermediate shaft can thereby be avoided.

According to an advantageous refinement of the present invention, the earth working machine can comprise, in the torque transfer path from the shiftable transmission to the working apparatus (including the respective aforesaid limits of the path), a braking apparatus with which the working apparatus can be brought to a stop when the torque transfer path is interrupted, in order to avoid the transfer of undesired drag torques.

Drag torques of this kind can occur, for example, at released clutches (such as the direct-drive clutch and/or the intermediate clutch) if the input-side and output-side clutch parts are in frictional contact despite being in a released state, in which ideally no torque is intended to be transferable via the clutch.

Although the braking apparatus can in principle be arranged at any point in the aforesaid torque transfer path, for optimum installation space utilization the braking apparatus is arranged in the shiftable transmission. For optimum functionality, the braking apparatus preferably interacts with a transmission part that is always rotating together with the output shaft, including the output shaft itself. In consideration of the available installation space, interaction with a component on the output drive side of the intermediate clutch has proven successful. With an appropriate selection of the transfer ratio of the second transmission sub-assemblage, the working apparatus can be brought to a stop there with less braking force than on the output shaft. Other locations for the interaction between braking apparatus and shiftable transmission components should not be ruled out, however. For example, a brake disc of the braking apparatus can likewise be mounted on the output shaft so as to rotate together with it.

Although consideration can be given to providing the entire change in rotation speed and torque of the second gearing stage in only one of the two transmission sub-assemblages, this is not preferred because of the different loading of components of the two transmission sub-assemblages which results therefrom. A more balanced load on the components involved in the respective transmission sub-assemblages is possible in principle thanks to the fact that the first transmission sub-assemblage and the second transmission sub-assemblage each have a transfer ratio differing from 1.

A maximally uniform distribution of load to the two transmission sub-assemblages in the context of the transfer of torque and rotation speed via the second gearing stage is advantageously possible thanks to the fact that the transfer ratio of the first transmission sub-assemblage and the transfer ratio of the second transmission sub-assemblage differ, based on the greater of the two transfer ratios, by no more than 3%, preferably by no more than 1.5%, particularly preferably by no more than 0.75%.

Transmission sub-assemblages whose transfer ratios differ by no more than 0.3 to 0.4% are very highly preferred. This is also possible in terms of design, as will be shown in detail below.

In principle, the two transmission sub-assemblages can be implemented using any desired transmission components that permit a transfer of rotation speed and torque with modification of the rotation speed and torque. For example, one or both of the transmission sub-assemblages can comprise a belt drive or chain drive in order to transfer rotation speed and torque. Because of the comparatively small installation space required for a high level of transferred power, however, it is preferred if the first transmission sub-assemblage is a first gear pair and if the second transmission sub-assemblage is a second gear pair.

In principle, consideration can be given to having the two transmission sub-assemblages use identical gear pairs and thus an identical transfer ratio. This has the advantage that the two transmission sub-assemblages can each be equipped with an identical set of gears, which advantageously minimizes component variation. If the use of identical gear pairs is not possible, for example for reasons of available installation space, it is preferred, in the interest of uniform loading of the two transmission sub-assemblages, if the transfer ratios of the first and the second transmission sub-assemblage differ only slightly. In the case of transmission sub-assemblages embodied as gear pairs, this can advantageously be achieved in that the tooth counts of the smaller gears of the first and the second gear pair differ by no more than two teeth, and that the tooth counts of the larger gears of the first and the second gear pair differ by no more than two teeth.

As is known per se, the functionality of the shiftable transmission presented by the present Application can extend beyond the mere transfer of power from the drive motor to the working apparatus. For example, that shiftable transmission can be part of a distributor transmission in which power can be tapped off at several points. In a preferred refinement of the present invention, provision is made for that purpose that the shiftable transmission comprises at least one, preferably more than one, power takeoff.

When the shiftable transmission of the earth working machine according to the present invention comprises more than one power takeoff, assurance should advantageously be provided that all the power takeoffs are always being rotationally driven regardless of the activation of the first or second gearing stage. This can be achieved by the fact that all the power takeoffs of the shiftable transmission are rotationally driven via the same transmission sub-assemblage.

This is advantageously the first transmission sub-assemblage, which is driven directly via the input shaft of the shiftable transmission, since as a rule the input drive pinion, sitting on the input shaft of the shiftable transmission, of the first transmission sub-assemblage is always rotating and the direct-drive clutch is arranged only after the first input drive pinion. All the power takeoffs of the shiftable transmission are therefore preferably driven rotationally via the first transmission sub-assemblage. In this case, torque is transferred via the first transmission sub-assemblage even if the first gearing stage is activated and the second gearing stage is deactivated. The power transferred to any power takeoffs is, however, orders of magnitude less than the power transferred between the principal input drive and principal output drive, so that it is considerably less relevant to the design of the shiftable transmission than the power transferred to the principal output drive.

As is known per se and has already been stated above, the working apparatus as a rule is not rotationally coupled directly to the output shaft of the shiftable transmission. Instead, a further transfer of drive power, with a change in rotation speed and torque, occurs between the shiftable transmission and the working apparatus. Preferably the output shaft is coupled in torque-transferring fashion to the working apparatus with interposition of at least one further transmission.

As has proven successful in the past, preferably at least two transmissions are provided between the principal output drive of the shiftable transmission and the working apparatus, one of which can be a belt drive and a further one of which can be a planetary gearset assemblage. Both transfer at least drive power, and for simple power transfer a change in the respective input- and output-side rotation speed/torque value pairs can occur. That change, i.e. a transfer ratio differing from 1, is always the case with the planetary gearset. It can be the case with the belt drive. The planetary gearset assemblage in particular offers the possibility of accommodating large transfer ratios in a comparatively small installation space. A belt drive, conversely, allows even long distances between the input shaft and output shaft to be spanned, which creates greater freedom in terms of arranging the drive components, namely the drive motor with shiftable transmission, and the working apparatus optionally having a further upstream transmission.

For example, the second gearing stage of the shiftable transmission can have a torque transfer ratio from input side to output side of between 0.6 and 0.9, preferably between 0.7 and 0.85, particularly preferably approximately 0.75. These values represent only exemplifying values, however, for a specific earth working machine, they depend on the drive motor being used and its operating characteristics, on the desired rotation speed range of the working apparatus, and on further transfer ratios implemented in the drive train between the drive motor and working apparatus.

In the preferred case of a rotating milling tool constituting the working apparatus, its desired working rotation speed range depends on its cutting circle diameter and its intended utilization situations. If its working apparatus is, as is preferred, provided replaceably on the earth working machine, the surface milling machine can use different working apparatuses to perform different tasks, which specifically require different rotation speeds when the different working apparatuses have substantially the same diameter or the same effective diameter. With the preferred exemplifying embodiment of a milling drum, the earth working machine can take on various tasks, for example fine milling (removing the topmost layer of the road surface) or demolition of entire layers of the road structure, by means of replaceable milling drums carrying milling tools. Because the focus here is on correct functioning of the milling tool that removes the layer, what is critical for the particular application is the cutting speed of the milling tool as an example of a general working speed, for example the orbital speed of a milling bit tip as it circulates around the milling drum axis. Different milling tool cutting speeds are respectively advantageous for the different applications. For fine milling, for example, a high cutting speed is desirable so as to generate a maximally homogeneous milling pattern, while a cutting speed that is as low as possible is desirable when removing entire layers, in order to reduce wear on the milling tools. Cutting speeds in the range from 3 to 8 m/s have proven successful in practical use for various milling tasks. The working apparatuses used on a surface milling machine usually have substantially identical cutting circle diameters, which as a rule differ by no more than 5% in terms of the respectively largest available cutting circle diameter.

The possibility that the working circle diameter of different replaceable working apparatuses may differ, even though they are associated with the same tasks or applications, should nevertheless not be ruled out. Even in such a case, different rotation speeds are required at the working apparatus depending on its respective working circle diameter, in order to achieve identical effective speeds (orbital speed) of working tools of the working apparatus which define the working circle diameter.

Taking as a basis, by way of example, a target effective speed range, in particular a target cutting speed range, a designer who knows the working point of the drive motor and the effective diameter of the working apparatus, in particular the diameter of the cutting circle of the milling drum, can design the drive train having the shiftable transmission in such a way that different effective speeds, which have a desired spacing (spread) from one another and both fall in the target effective speed range, are achievable with each of the two gearing stages.

If the aforementioned belt drive is provided between the shiftable transmission and the working apparatus, said drive also preferably has a torque transfer ratio from the input side to the output side of 0.6 to 1. The design of the belt drive is usually driven more by the installation space available to accommodate it than by a transfer ratio to be achieved with the belt drive.

If an internal combustion engine, in particular a diesel internal combustion engine, is used as a drive motor, then in the preferred steady-state range it rotates at a rotation speed in the range from approximately 1000 to 2500 rpm, in particular between 1300 and 2000 rpm. If the working apparatus is, as is preferred for the present invention, a milling tool (e.g. a milling drum or milling rotor) rotatable around a milling tool axis, a transfer of drive power of the internal combustion engine to the working apparatus with a reduction in rotation speed and an increase in torque is then desirable over the entire drive train of the working apparatus.

If a further transmission is interposed between the milling drum and belt drive after the belt drive, that transmission, preferably embodied as a planetary gearset assemblage, can have, for example, a torque transfer ratio from input side to output side of more than 8, preferably more than 13, but less than 28, preferably less than 23. The design of the further transmission is also subject to the boundary conditions presented above in conjunction with the design of the shiftable transmission. The drive train as a whole is intended to make possible, proceeding from a known optimum drive motor rotation speed and known dimensions of the working apparatus, operating rotation speeds of the working apparatus having a predefined spread in a rotation speed range ascertained as discussed above.

For maintenance of the working apparatus, the drive train between the output shaft of the shiftable transmission and the working apparatus is preferably embodied for temporary attachment of an auxiliary drive. Because of their easy accessibility, one of the belt pulleys of the belt drive is preferably embodied for auxiliary drive attachment, for example by constitution of a corresponding coupling fixture thereon.

The earth working machine according to the present invention can be a road miller, a surface miner, a surface stabilizer, or a recycler.

BRIEF DESCRIPTION OF THE DRAWINGS

The present invention will be explained in further detail below with reference to the appended drawings, in which.

DETAILED DESCRIPTION

Figure 1:
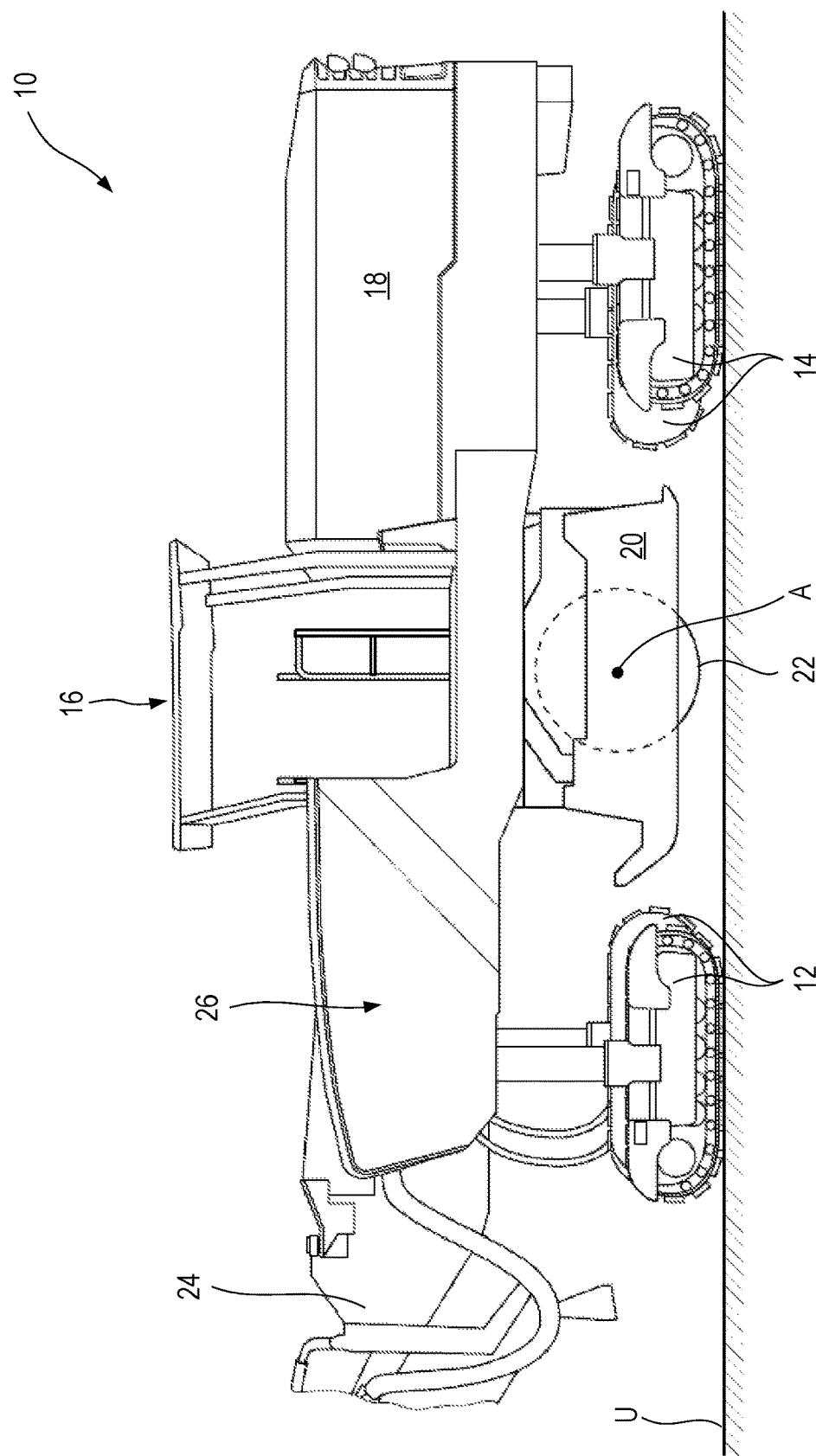
FIG. 1 is an exemplifying view of an embodiment according to the present invention of an earth working machine of the present Application.

In FIG. 1, an earth working machine according to the present invention is labeled generally with the number 10. Earth working machine 10, embodied in the present example as a large road milling machine, stands on substrate U that is to be worked by it. The large road milling machine has for this purpose front 12 and rear 14 drive units that can be embodied as wheels or as crawler track units, which are known per se and will not be further discussed here.

Large road milling machine 10 comprises an operator's platform 16 from which large road milling machine 10 can be controlled and operated.

Figure 2:
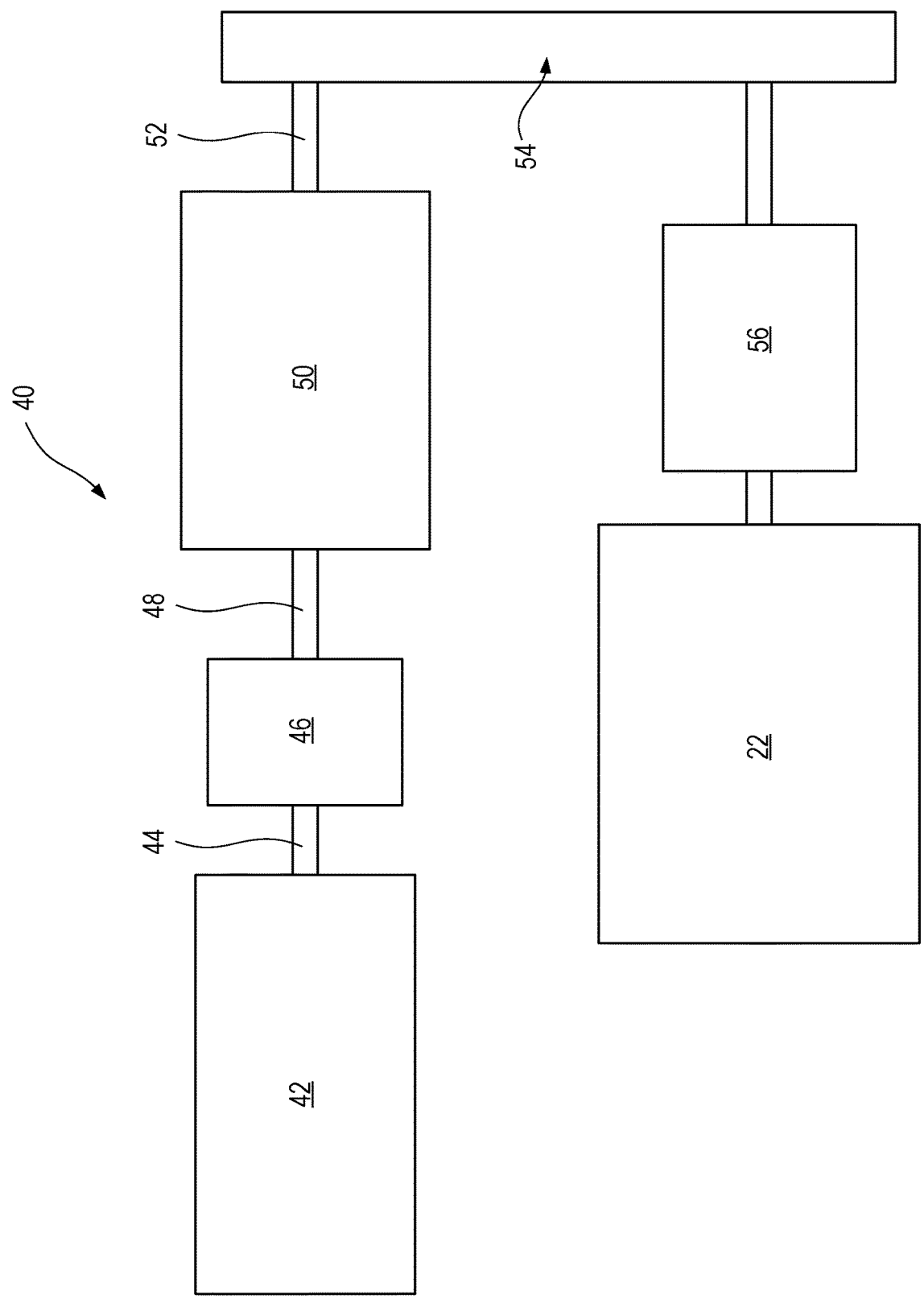
FIG. 2 is a schematic block view of a drive train of the earth working machine of FIG. 1.

Located in the region behind operator's platform 16, i.e. between operator's platform 16 and the rear end of large road milling machine 10, is an engine compartment 18 in which is arranged an internal combustion engine 42 explained in further detail in conjunction with FIG. 2, which furnishes drive power for propelling and operating large road milling machine 10.

Located in the region below operator's platform 16 and between the front and rear drive units 12 and 14 in a longitudinal machine direction is a milling drum housing 20 in which a milling drum 22 constituting a working apparatus, rotatable around a milling drum axis A orthogonal to the drawing plane of FIG. 1, i.e. the transverse direction of large road milling machine 10, is received.

With milling drum 22, substrate U can be removed to a removal depth predetermined by modifying the height of machine frame 26 relative to drive units 12 and 14. Alternatively or additionally, milling drum 22 can be received in machine frame 26 vertically adjustably relative thereto. The milled material removed by milling drum 22 is wetted in milling drum housing 20 in order to decrease the environmental dust impact of large road milling machine 10, and conveyed by discharge device 24, indicated in FIG. 1 as being merely in the vicinity of the machine, in front of large road milling machine 10. During operation, large road milling machine 10 therefore usually follows a truck whose loading device it fills with bulk material while being operated to remove substrate U.

Numerous apparatuses on large road milling machine 10, for example the vertical adjustment system for machine frame 26 relative to drive units 12 and 14, or the steering system for drive units 12 and 14 and the propulsion system for drive units 12 and 14, are implemented by way of hydraulic motors or hydraulic pumps. Milling drum 22, conversely, can be mechanically driven to move by way of internal combustion engine 42 received in engine compartment 18. Internal combustion engine 42 is a drive power source both for the mechanically driven milling drum 22 and for the hydraulically actuatable or drivable apparatuses of large road milling machine 10.

In FIG. 2, the drive train of the working apparatus of earth working machine 10 of FIG. 1, in the form of a highly schematic block diagram, is labeled with the reference character 40. Drive train 40 encompasses internal combustion engine 42, for example in the form of a diesel internal combustion engine, as a source of drive power. The use of an Otto-cycle engine as a drive motor is, however, also not excluded. Drive shaft 44 of internal combustion engine 42 is coupled, with interposition of an elastic coupling 46 known per se, to input shaft 48 of a shiftable transmission 50 described in detail below in conjunction with FIG. 3.

With the use of shiftable transmission 50 it is possible to operate the internal combustion engine at an optimum steady-state rotation speed and nevertheless to allow working apparatus 22, for example in the form of a milling drum or milling rotor, to operate at different rotation speeds and different torques. The steady-state operating rotation speed of internal combustion engine 42 can be selected for optimum performance, optimum emissions, and/or optimum consumption.

An output shaft 52 of shiftable transmission 50 is coupled, via a belt drive 54 known per se, to the input side of a planetary gearset assemblage 56 that is connected on the output side to working apparatus 22 in torque-transferring fashion.

Belt drive 54 comprises at least two belt pulleys, one of which can be embodied for temporary attachment of an auxiliary drive so that working apparatus 22 can be rotated at low speed for maintenance and/or repair purposes.

As already noted above, what is depicted in FIG. 2 is merely a highly schematic block diagram. Planetary gearset assemblage 56 can in fact be arranged at least in part, or in fact entirely, in the interior of working apparatus 22.

In the exemplifying embodiment depicted, working apparatus 22 encompasses a hollow cylindrical milling drum on whose outer side milling bits are arranged, usually with interposition of bit holders or quick-change bit holders. The cavity radially inside the milling drum and surrounded by it offers space to at least partly accommodate planetary gearset assemblage 56.

As a rule, what takes place in drive train 40 is that the rotation speed of drive shaft 44 of internal combustion engine 42 is stepped down and the torque available at drive shaft 44 is stepped up. This means that working apparatus 22 rotates around its working apparatus axis more slowly than drive shaft 44 does around its rotation axis, but with a torque that, ignoring unavoidable losses, is reciprocally greater.

Whereas, in the exemplifying embodiment presented, belt drive 54 steps torque down and rotation speed up from the input side to the output side, planetary gearset assemblage 56 steps torque up and steps speed down. In the example shown in FIG. 2, the planetary gearset assemblage is in fact the only one of the three rotation speed- and torque-converting apparatuses 50, 54, 56 which steps rotation speed down and steps torque up. In the present exemplifying embodiment, for example, the torque transfer ratio of the belt drive from the input side to the output side can be selected to be between 0.78 and 0.8, and in the present exemplifying embodiment the torque transfer ratio of planetary gearset assemblage 56 from the input side to the output side can be equal to approximately 20.5 to 20.7.

Input shaft 48 of shiftable transmission 50 constitutes, more precisely, a principal input drive of shiftable transmission 50. Output shaft 52, depicted in FIG. 2, of shiftable transmission 50 likewise constitutes a principal output drive thereof.

Figure 3:
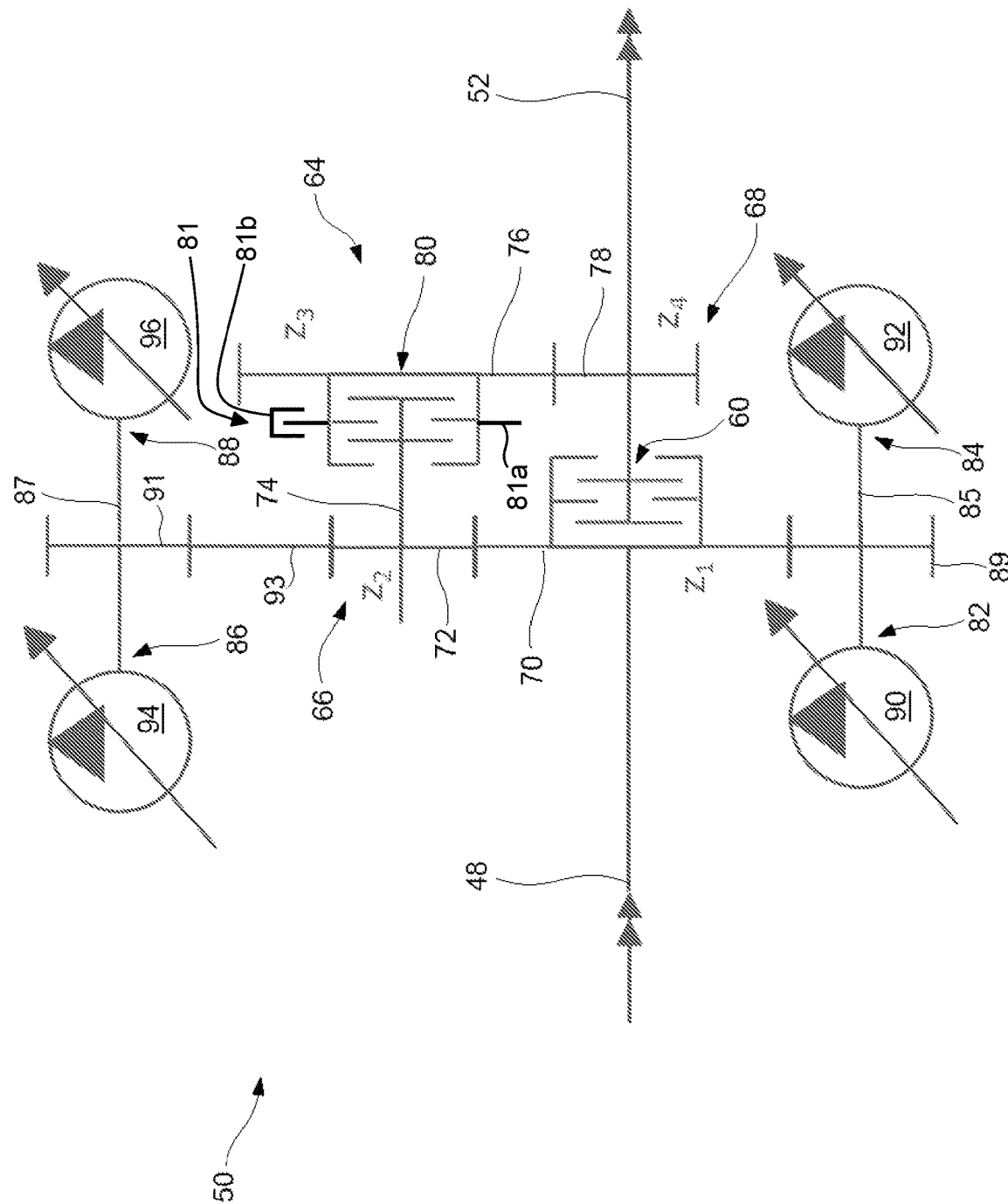
FIG. 3 schematically depicts a first embodiment of the shiftable transmission from the drive train of FIG. 2.

A first embodiment of shiftable transmission 50 is depicted highly schematically in FIG. 3.

As depicted in FIG. 3, input shaft 48 and output shaft 52 of shiftable transmission 50 are selectably connectable to one another so as to rotate together at the same speed, or disconnectable from one another, by way of a direct-drive clutch 60. The direct-drive clutch can be, for example, a multi-disc clutch. By way of direct-drive clutch 60, input shaft 48 can be connected to output shaft 52 of the shiftable transmission to yield a shaft arrangement rotating together. Very high efficiency in terms of power transfer from internal combustion engine 42 to working apparatus 22 is thereby achieved.

Direct-drive clutch 60 constitutes a first gearing stage for torque-transferring connection of input shaft 48 and output shaft 52. With this first gearing stage, no transmission assemblage of any kind is involved in the transfer of drive power from input shaft 48 to output shaft 52.

A second gearing stage that can likewise be implemented on shiftable transmission 50 encompasses a transmission assemblage 64 that, upon activation of the second gearing stage and deactivation of the first gearing stage, transfers drive power from input shaft 48 to output shaft 52 of shiftable transmission 50.

Transmission assemblage 64 encompasses a first transmission sub-assemblage 66 located closer to the input side, and a second transmission sub-assemblage 68 located closer to the output side, of shiftable transmission 50.

In the exemplifying embodiment according to the present invention that is depicted, each of the two transmission sub-assemblages 66 and 68 encompasses exactly one gear pair.

First transmission sub-assemblage 66 encompasses input drive pinion 70, which meshes with an output drive pinion 72 of the first transmission sub-assemblage. In the example depicted, output drive pinion 72 is arranged on an intermediate shaft 74 so as to rotate together.

The tooth count of input drive pinion is assumed to be $z_1$ and the tooth count of output drive pinion 72 is assumed to be $z_2$; as shown in FIG. 3, $z_1 > z_2$.

Intermediate shaft 74 furthermore carries input drive pinion 76 of the second transmission sub-assemblage, which meshes with output drive pinion 78 of the second transmission sub-assemblage on output shaft 52.

In the embodiment depicted, output drive pinion 78 is fixedly connected to output shaft 52 of shiftable transmission 50 so as to rotate together therewith at the same speed. In the example depicted, input drive pinion 76 of the second transmission sub-assemblage is selectably connectable to intermediate shaft 74 so as to rotate together, or disconnectable therefrom, via an intermediate clutch 80.

Intermediate clutch 80 can again be a multi-disc clutch.

In a departure from what is depicted in FIG. 3, intermediate shaft 74 can also be embodied as a split intermediate shaft, in which case input drive pinion 76 can then be fixedly coupled to the output drive side of intermediate shaft 74, and the input drive side and output drive side of the (now split) intermediate shaft can be connectable to one another in order to rotate together, or disconnectable from one another, by way of intermediate clutch 80.

Input drive pinion 76 of the second transmission sub-assemblage has a tooth count $z_3$ that is greater than the tooth count $z_4$ of output drive pinion 78 of second transmission sub-assemblage 68.

The tooth counts $z_1$, $z_2$, $z_3$, and $z_4$ are selected so that the tooth counts of pinions of similar size, i.e. for example the tooth counts $z_1$ and $z_3$ of the two input drive pinions 70 and 76, likewise differ from one another by no more than two teeth, as also do the tooth counts $z_2$ and $z_4$ of the similarly sized output drive pinions 72 and 78. It is then the case that the transfer ratios of the two transmission sub-assemblages 66 and 68 can differ by no more than 1%, so that for an assumed overall transfer ratio j of transmission assemblage 64, it is approximately true that each transfer ratio of transmission sub-assemblages 66 and 68 is approximately the square root of j. The result is that at the meshing engagement points of the respective transmission sub-assemblages, i.e. between pinions 70 and 72 on the one hand and between pinions 76 and 78 on the other hand, the forces that are transferred between the pinions are approximately the same, which results in homogeneous loading of the two transmission sub-assemblages and thus uniform wear behavior for the entire transmission assemblage 64.

With the arrangement of direct-drive clutch 60 and intermediate clutch 80 as shown, shiftable transmission 50 can advantageously be shifted between its two gearing stages under load. It is therefore possible to switch, with no interruption in load, between direct drive and the transfer ratio furnished by transmission assemblage 64.

For reliable stoppage of the working apparatus when both clutches (direct-drive clutch 60 and intermediate clutch 80) are released, shiftable transmission 50 preferably comprises a braking apparatus 81 that, in the present embodiment, interacts with the output drive side of intermediate clutch 80. A brake disc 81a, on which braking force can be exerted by a brake caliper 81b of braking apparatus 81, can be provided for this purpose on the output drive side of intermediate clutch 80.

Merely for the sake of completeness, be it noted that shiftable transmission 50 comprises four further power takeoffs 82, 84, 86, 88.

Hydraulic pumps 90, 92, 94, 96 are respectively coupled to power takeoffs 82, 84, 86, 88. Shiftable transmission 50 is thus, in the present case, a pump distributor transmission.

In the example depicted, power takeoffs 82 and 84 are located on a common first power takeoff shaft 85. Power takeoffs 86 and 88 are located on a common second power takeoff shaft 87.

First power takeoff shaft 85 is rotationally driven by a power takeoff pinion 89 that is connected to first power takeoff shaft 85 so as to rotate together, and meshes permanently with input drive pinion 70 of first transmission sub-assemblage 66.

Second power takeoff shaft 87 also has a second power takeoff pinion 91 connected nonrotatably to it so as to rotate together. Said pinion is rotationally driven indirectly, with interposition of an intermediate pinion 93, by output drive pinion 72 of first transmission sub-assemblage 66. This ensures that first and second power takeoff shafts 85 and 87 rotate in the same direction. It also ensures that, regardless of the engagement states of direct-drive clutch 60 and intermediate clutch 80, torque is always transferred both to first power takeoff shaft 85 and to second power takeoff shaft 87.

A control apparatus of shiftable transmission 50 ensures exclusion of critical operating states, for example simultaneous torque transfer engagement of both direct-drive clutch 60 and intermediate clutch 80, or braking engagement of braking apparatus 81 when direct-drive clutch 60 and intermediate clutch 80 are not both released. The control apparatus of shiftable transmission 50 can be implemented by a machine control apparatus of earth working machine 10, or can be a control apparatus separate therefrom, for example using respective microprocessors and/or stored-program control systems as known in the existing art.

In a departure from what is depicted in FIG. 3, a part of intermediate shaft 74 which is constantly rotationally driven by the input shaft can also be guided out of a housing of shiftable transmission 50 as an additional or alternative power takeoff.

Only one of the two clutches (direct-drive clutch 60 and intermediate clutch 80) can be respectively activated for torque transfer, while the other must be deactivated. It is possible, however, to deactivate both clutches 60 and 80 simultaneously, for example if torque is required only at the power takeoffs but not at the principal output drive.

Figure 4:
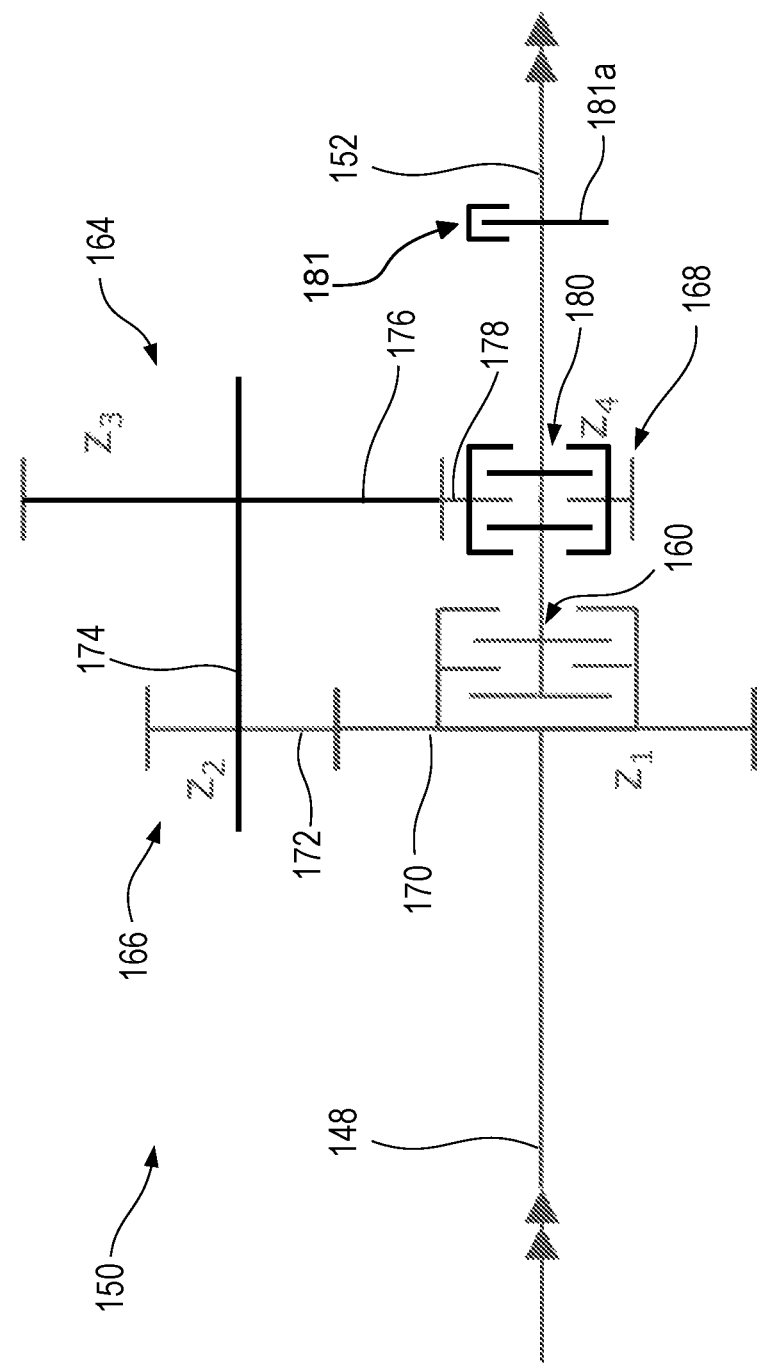
FIG. 4 schematically depicts a second embodiment of the shiftable transmission from the drive train of FIG. 2.

FIG. 4 depicts a second embodiment of a shiftable transmission according to the present invention. Identical and functionally identical components and component portions are labeled in FIG. 4 with the same reference characters as in FIG. 3, but incremented by 100. The second embodiment in FIG. 4 will be described below only to the extent that it differs from the first embodiment in FIG. 3, the description of which is otherwise also to be referred to for an explanation of the second embodiment in FIG. 4.

Shiftable transmission 150 of FIG. 4 comprises no power takeoffs, but only the principal input drive through input shaft 148 and principal output drive via output shaft 152.

Intermediate clutch 180 in FIG. 4 is also, merely as an illustration of design options, arranged not on intermediate shaft 174 but on output shaft 152. Intermediate clutch 180 serves to selectably connect output drive pinion 178 of second transmission sub-assemblage 164 to output shaft 152 or disconnect it therefrom.

Even though intermediate clutch 180 is arranged on output shaft 152 of shiftable transmission 150, it is an intermediate clutch 180 for purposes of the present Application because it is arranged in the torque transfer path of transmission arrangement 168 and enables interruption or establishment of a transfer of torque from input shaft 148 to output shaft 152 via intermediate shaft 174.

In this second embodiment, braking apparatus 181 interacts with output shaft 152, which supports a brake disc 181 so as to rotate together with it.

The invention claimed is:

1. An earth working machine, comprising:
   a drive motor;
   a milling drum;
   a planetary gearset assemblage connected to the milling drum;
   a shiftable transmission connecting the drive motor to the milling drum for transfer of a torque to rotate the milling drum, the shiftable transmission including:
      an input shaft coupled to the drive motor;
      an output shaft coupled to the milling drum;
      a first gearing stage having a first torque transfer ratio, the first gearing stage being configured to connect the input shaft to the output shaft for transfer of torque and so as to move the input shaft and the output shaft rotationally together at the same rotation speed; and
      a second gearing stage having a second torque transfer ratio different from the first torque transfer ratio, the second gearing stage including a transmission assemblage configured to connect the input shaft to the output shaft for transfer of torque and so as to move the input shaft and the output shaft rotationally together at different rotation speeds and
   a belt drive connected between output shaft of the shiftable transmission and the planetary gearset assemblage.

2. The earth working machine of claim 1, wherein:
   the first gearing stage includes a direct-drive clutch having a first engagement state in which the input shaft is connected to the output shaft via the direct-drive clutch so as to move the input shaft and the output shaft rotationally together at the same rotation speed, and the direct-drive clutch having a second engagement state in which the input shaft is not connected to the output shaft via the direct drive clutch.

3. The earth working machine of claim 2, wherein:
the second gearing stage includes:
an intermediate shaft;
a first transmission sub-assemblage of the transmission assemblage, the first transmission sub-assemblage connecting the intermediate shaft to the input shaft;
a second transmission sub-assemblage of the transmission assemblage, the second transmission sub-assemblage connecting the intermediate shaft to the output shaft; and
an intermediate clutch having a first engagement state in which torque transfer from the input shaft to the output shaft is established via the intermediate shaft and the intermediate clutch, and the intermediate clutch having a second engagement state in which torque transfer from the input shaft to the output shaft via the intermediate shaft and the intermediate clutch is interrupted.

4. The earth working machine of claim 1, wherein:
the second gearing stage includes:
an intermediate shaft;
a first transmission sub-assemblage of the transmission assemblage, the first transmission sub-assemblage connecting the intermediate shaft to the input shaft;
a second transmission sub-assemblage of the transmission assemblage, the second transmission sub-assemblage connecting the intermediate shaft to the output shaft; and
an intermediate clutch having a first engagement state in which torque transfer from the input shaft to the output shaft is established via the intermediate shaft and the intermediate clutch, and the intermediate clutch having a second engagement state in which torque transfer from the input shaft to the output shaft via the intermediate shaft and the intermediate clutch is interrupted.

5. The earth working machine of claim 4, wherein:
the first transmission sub-assemblage and the second transmission sub-assemblage each have a transfer ratio differing from 1.

6. The earth working machine of claim 5, wherein:
the transfer ratio of the first transmission sub-assemblage and the transfer ratio of the second transmission sub-assemblage differ based on the greater of the two transfer ratios, by no more than 3%.

7. The earth working machine of claim 5, wherein:
the transfer ratio of the first transmission sub-assemblage and the transfer ratio of the second transmission sub-assemblage differ based on the greater of the two transfer ratios, by no more than 1.5%.

8. The earth working machine of claim 5, wherein:
the transfer ratio of the first transmission sub-assemblage and the transfer ratio of the second transmission sub-assemblage differ based on the greater of the two transfer ratios, by no more than 0.75%.

9. The earth working machine of claim 4, wherein:
the first transmission sub-assemblage includes a first gear pair; and
the second transmission sub-assemblage includes a second gear pair.

10. The earth working machine of claim 9, wherein:
the first gear pair includes a first smaller gear and a first larger gear; and
the second gear pair includes a second smaller gear and a second larger gear;
a tooth count of the first smaller gear and a tooth count of the second smaller gear differ by no more than two teeth; and
a tooth count of the first larger gear and a tooth count of the second larger gear differ by no more than two teeth.

11. The earth working machine of claim 1, wherein:
the shiftable transmission further includes at least one power takeoff.

12. The earth working machine of claim 1, wherein:
the shiftable transmission further includes more than one power takeoff.

13. The earth working machine of claim 12, wherein:
the second gearing stage includes:
an intermediate shaft;
a first transmission sub-assemblage of the transmission assemblage, the first transmission sub-assemblage connecting the intermediate shaft to the input shaft;
a second transmission sub-assemblage of the transmission assemblage, the second transmission sub-assemblage connecting the intermediate shaft to the output shaft; and
an intermediate clutch having a first engagement state in which torque transfer from the input shaft to the output shaft is established via the intermediate shaft and the intermediate clutch, and the intermediate clutch having a second engagement state in which torque transfer from the input shaft to the output shaft via the intermediate shaft and the intermediate clutch is interrupted; and
all of the power takeoffs of the shiftable transmission are rotationally driven via the same transmission sub-assemblage.

14. An earth working machine, comprising:
a drive motor;
a milling drum;
a shiftable transmission connecting the drive motor to the milling drum for transfer of a torque to rotate the milling drum, the shiftable transmission including:
an input shaft coupled to the drive motor;
an output shaft coupled to the milling drum;
a first gearing stage having a first torque transfer ratio, the first gearing stage being configured to connect the input shaft to the output shaft for transfer of torque and so as to move the input shaft and the output shaft rotationally together at the same rotation speed; and
a second gearing stage having a second torque transfer ratio different from the first torque transfer ratio, the second gearing stage including a transmission assemblage configured to connect the input shaft to the output shaft for transfer of torque and so as to move the input shaft and the output shaft rotationally together at different rotation speeds;
wherein the second gearing stage includes:
an intermediate shaft;
a first transmission sub-assemblage of the transmission assemblage, the first transmission sub-assemblage connecting the intermediate shaft to the input shaft;
a second transmission sub-assemblage of the transmission assemblage, the second transmission sub-assemblage connecting the intermediate shaft to the output shaft; and an intermediate clutch having a first engagement state in which torque transfer from the input shaft to the output shaft is established via the intermediate shaft and the intermediate clutch, and the intermediate clutch having a second engagement state in which torque transfer from the input shaft to the output shaft via the intermediate shaft and the intermediate clutch is interrupted;

wherein the first transmission sub-assemblage and the second transmission sub-assemblage each have a transfer ratio differing from 1; and wherein the transfer ratio of the first transmission sub-assemblage and the transfer ratio of the second transmission sub-assemblage differ based on the greater of the two transfer ratios, by no more than 3%.

15. The earth working machine of claim 14, wherein: the transfer ratio of the first transmission sub-assemblage and the transfer ratio of the second transmission sub-assemblage differ based on the greater of the two transfer ratios, by no more than 1.5%.

16. The earth working machine of claim 14, wherein: the transfer ratio of the first transmission sub-assemblage and the transfer ratio of the second transmission sub-assemblage differ based on the greater of the two transfer ratios, by no more than 0.75%.

17. The earth working machine of claim 14, wherein: the first transmission sub-assemblage includes a first gear pair; and the second transmission sub-assemblage includes a second gear pair.

18. The earth working machine of claim 17, wherein: the first gear pair includes a first smaller gear and a first larger gear; and the second gear pair includes a second smaller gear and a second larger gear;

a tooth count of the first smaller gear and a tooth count of the second smaller gear differ by no more than two teeth; and a tooth count of the first larger gear and a tooth count of the second larger gear differ by no more than two teeth.

19. The earth working machine of claim 14, wherein: the shiftable transmission further includes at least one power takeoff.

20. The earth working machine of claim 14, wherein: the shiftable transmission further includes more than one power takeoff; and all of the power takeoffs of the shiftable transmission are rotationally driven via the same transmission sub-assemblage.

* * * * *